United States Patent
Neiger et al.

(10) Patent No.: US 7,424,709 B2
(45) Date of Patent: *Sep. 9, 2008

(54) USE OF MULTIPLE VIRTUAL MACHINE MONITORS TO HANDLE PRIVILEGED EVENTS

(75) Inventors: Gilbert Neiger, Portland, OR (US); Steven M. Bennett, Hillsboro, OR (US); Alain Kägi, Portland, OR (US); Stalinselvaraj Jeyasingh, Beaverton, OR (US); Andrew V. Anderson, Hillsboro, OR (US); Richard Uhlig, Hillsboro, OR (US); Erik Cota-Robles, Portland, OR (US); Scott Rodgers, Hillsboro, OR (US); Lawrence Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 883 days.

This patent is subject to a terminal disclaimer.

(21) Appl. No.: 10/663,206

(22) Filed: Sep. 15, 2003

(65) Prior Publication Data
US 2005/0071840 A1 Mar. 31, 2005

(51) Int. Cl.
*G06F 9/455* (2006.01)
*G06F 9/46* (2006.01)
(52) U.S. Cl. .......................... 718/1; 719/318
(58) Field of Classification Search ............... 709/1; 395/182.08; 718/1; 719/318
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. ............. 711/166 |
| 4,276,594 A | 6/1981 | Morley |
| 4,278,837 A | 7/1981 | Best |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |

(Continued)

FOREIGN PATENT DOCUMENTS

DE 4217444 12/1992

(Continued)

OTHER PUBLICATIONS

Berg, Cliff , "How Do I Create a Signed Applet?", *Dr. Dobb's Journal*, (Aug. 1997), 1-9.

(Continued)

*Primary Examiner*—Meng-Ai An
*Assistant Examiner*—Camquy Truong
(74) *Attorney, Agent, or Firm*—Blakely, Sokoloff, Taylor & Zafman LLP

(57) ABSTRACT

In one embodiment, a method for handling privileged events in a virtual machine environment includes detecting an occurrence of a privileged event, determining which one of multiple virtual machine monitors (VMMs) is to handle the privileged event, and transitioning control to this VMM.

29 Claims, 7 Drawing Sheets

U.S. PATENT DOCUMENTS

| | | | |
|---|---|---|---|
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |
| 4,571,672 A | 2/1986 | Hatada et al. | |
| 4,621,318 A | 11/1986 | Maeda | |
| 4,759,064 A | 7/1988 | Chaum | |
| 4,795,893 A | 1/1989 | Ugon | |
| 4,802,084 A | 1/1989 | Ikegaya et al. | |
| 4,825,052 A | 4/1989 | Chemin et al. | |
| 4,843,541 A | 6/1989 | Bean et al. | |
| 4,907,270 A | 3/1990 | Hazard | |
| 4,907,272 A | 3/1990 | Hazard | |
| 4,910,774 A | 3/1990 | Barakat | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | 711/164 |
| 5,187,802 A | 2/1993 | Inoue et al. | |
| 5,230,069 A | 7/1993 | Brelsford et al. | |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Hotley et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,488,716 A * | 1/1996 | Schneider et al. | 714/10 |
| 5,504,922 A | 4/1996 | Seki et al. | |
| 5,506,975 A | 4/1996 | Onodera | |
| 5,511,217 A | 4/1996 | Nakajima et al. | |
| 5,522,075 A | 5/1996 | Robinson et al. | |
| 5,528,231 A | 6/1996 | Patarin | |
| 5,533,126 A | 7/1996 | Hazard et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubals | |
| 5,566,323 A | 10/1996 | Ugon | |
| 5,568,552 A | 10/1996 | Davis | |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | 711/163 |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle et al. | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,825,875 A | 10/1998 | Ugon | |
| 5,825,880 A | 10/1998 | Sudia et al. | |
| 5,835,594 A | 11/1998 | Albrecht et al. | |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,890,189 A | 3/1999 | Nozue | |
| 5,900,606 A | 5/1999 | Rigal et al. | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,944,821 A | 8/1999 | Angelo | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo et al. | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Isley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,249,872 B1 | 6/2001 | Wildgrube et al. | 713/200 |
| 6,252,650 B1 | 6/2001 | Nakaumra | |
| 6,269,392 B1 | 7/2001 | Cotichini et al. | |
| 6,272,533 B1 | 8/2001 | Browne | 709/213 |
| 6,272,637 B1 | 8/2001 | Little et al. | 713/194 |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | 711/153 |
| 6,301,646 B1 | 10/2001 | Hostetter | |
| 6,308,270 B1 | 10/2001 | Guthery et al. | |
| 6,314,409 B2 | 11/2001 | Schneck et al. | |
| 6,321,314 B1 | 11/2001 | Van Dyke | |

| | | |
|---|---|---|
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. ............ 710/105 |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,496,847 B1 * | 12/2002 | Bugnion et al. ................. 718/1 |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,944,699 B1 * | 9/2005 | Bugnion et al. ............. 710/269 |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2003/0231328 A1 * | 12/2003 | Chapin et al. .............. 358/1.13 |
| 2004/0117539 A1 | 6/2004 | Bennett et al. |
| 2005/0039180 A1 * | 2/2005 | Fultheim et al. ................ 718/1 |

FOREIGN PATENT DOCUMENTS

| | | |
|---|---|---|
| EP | 0473913 | 3/1992 |
| EP | 0600112 | 6/1994 |
| EP | 0602867 | 6/1994 |
| EP | 0892521 | 1/1999 |
| EP | 0930567 | 7/1999 |
| EP | 0961193 | 12/1999 |
| EP | 0965902 | 12/1999 |
| EP | 1030237 | 8/2000 |
| EP | 1055989 | 11/2000 |
| EP | 1056014 | 11/2000 |
| EP | 1085396 | 3/2001 |
| EP | 1146715 | 10/2001 |
| EP | 1209563 | 5/2002 |
| EP | 1271277 | 1/2003 |
| JP | 2000076139 | 3/2000 |
| WO | WO952496 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9918511 | 4/1999 |
| WO | WO9957863 | 11/1999 |
| WO | WO9965579 | 12/1999 |
| WO | WO0021238 | 4/2000 |
| WO | WO0062232 | 10/2000 |
| WO | WO0127723 | 4/2001 |
| WO | WO0127821 | 4/2001 |
| WO | WO0163994 | 8/2001 |
| WO | WO0175565 | 10/2001 |
| WO | WO0175595 | 10/2001 |
| WO | WO0201794 | 1/2002 |
| WO | WO9909482 | 1/2002 |
| WO | WO0217555 | 2/2002 |
| WO | WO02060121 | 8/2002 |
| WO | WO0175564 | 10/2002 |
| WO | WO02086684 | 10/2002 |
| WO | WO03058412 | 7/2003 |

OTHER PUBLICATIONS

Brands, Stefan, "Restrictive Blinding of Secret-Key Certificates", *Springer-Verlang XP002201306*, (1995), Chapter 3.

Chien, Andrew A., et al., "Safe and Protected Execution for the Morph/AMRM Reconfigurable Processor", *7th Annual IEEE Symposium, FCCM '99 Proceedings*, XP010359180, ISBN 0-7695-0375-6, Los Alamitos, CA, (Apr. 21, 1999), 209-221.

COMPAQ Computer Corporation, et al., "Trusted Computing Platform Alliance (TCPA) Main Specification Version 1,1a", (Dec. 2001),1-321.

Davida, George I., et al., "Defending Systems Against Viruses through Cryptographic Authentication", *Proceedings of the Symposium on Security and Privacy*, IEEE Comp. Soc. Press, ISBN 0-8186-1939, (May 1989).

Goldberg, Robert P., "Survey of Virtual Machine Research", *Computer Magazine*, (Jun. 1974),34-35.

Gong, Li, et al., "Going Behond the Sandbox: An Overview of the New Security Architecture in the Java Development Kit 1.2", *Proceedings of the USENIX Symposium on Internet Technologies and Systems*, Monterey, CA, (Dec./1997), Gum, P. H., "System/370 Extended Architecture: Facilities for Virtual Machines", *IBM J. Research Development*, vol. 27, No. 6, (Nov. 1983), 530-544.

Heinrich, Joe, "MIPS R4000 Microprocessor User's Manual, Second Edition", *Chapter 4 "Memory Management"*, (Jun. 11, 1993), 61-97.

IBM, "Information Display Technique for a Terminate Stay Resident Program IBM Technical Disclosure Bulletin", *TDB-ACC-No. NA9112156*, vol. 34, Issue 7A, (Dec. 1, 1991),156-158.

INTEL, "IA-32 Intel Architecture Software Developer's Manual", vol. 3: *System Programming Guide*, Intel Corporation—2003, 13-1 through 13-24.

INTEL, "Intel386 DX Microprocessor 32-Bit CHMOS Microprocessor With Integrated Memory Management", (1995),5-56.

Karger, Paul A., et al., "A VMM Security Kernal for the VAX Architecture", *Proceedings of the Symposium on Research in Security and Privacy*, XP010020182, ISBN 0-8186-2060-9, Boxborough, MA, (May 7, 1990),2-19.

Kashiwagi, Kazuhiko, et al., "Design and Implementation of Dynamically Reconstructing System Software", *Software Engineering Conference*, Proceedings 1996 Asia-Pacific Seoul, South Korea Dec. 4-7,1996, Los Alamitos, CA USA, IEEE Comput. Soc, US, ISBN 0-8186-7638-8,(1996).

Lawton, Kevin, et al., "Running Multiple Operating Systems Concurrently on an IA32 PC Using Virtualization Techinques", http://www.plex86.org/research/paper.txt, (Nov. 29, 1999),1-31.

Luke, Jahn, et al., "Replacement Strategy for Aging Avioinics Computers", *IEEE AES Systems Magazine*, XP002190614,(Mar. 1999).

Menezes, Oorschot, "Handbook of Applied Cryptography", *CRC Press LLC, USA XP002201307*, (1997),475.

Motorola, "M68040 User's Manual", (1993),1-1 to 8-32.

Richt, Stefan, et al., "In-Circuit-Emulator Wird Echtzeittauglich", *Elektronic, Franzis Verlag GMBH*, Munchen, DE, vol. 40, No. 16, XP000259620,(100-103),Aug. 6, 1991.

Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.

Rosenblum, M., "Virtual Platform: A Virtual Machine Monitor for Commodity PC", *Proceedings of the 11th Hotchips Conference*, (Aug. 17, 1999), 185-196.

Saez, Sergio, et al., "A Hardware Scheduler for Complex Real-Time Systems", *Proceedings of the IEEE International Symposium on Industrial Electronics*, XP002190615,(Jul. 1999),43-48.

Sherwood, Timothy, et al., "Patchable Instruction ROM Architecture", *Department of Computer Science and Engineering, University of California*, San Diego, La Jolla, CA, (Nov. 2001).

Coulouris, George, et al., "Distributed Systems, Concepts and Designs", *2nd Edition*, (1994), 422-424.

Crawford, John, "Architecture of the Intel 80386", *Proceedings of the IEEE International Conference on Computer Design: VLSI in Computers and Processors (ICCD '86)*, (Oct. 6, 1986), 155-160.

Fabry, R.S., "Capability-Based Addressing", *Communications of the ACM*, vol. 17, No. 7, (Jul. 1974), 403-412.

Frieder, Gideon, "The Architecture And Operational Characteristics of the VMX Host Machine", *The Architecture And Operational Characteristics of the VMX Host Machine, IEEE*, (1982),9-16.

HP Mobile Security Overview, "HP Mobile Security Overview", (Sep. 2002),1-10.

IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.

Intel Corporation, "IA-64 System Abstraction Layer Specification", *Intel Product Specification*, Order No. 245359-001, (Jan. 2000), 1-112.

Intel Corporation, "Intel 82802AB/82802AC Firmware-Hub (FWH)", *Intel Product Datasheet*, Document No. 290658-004, (Nov. 2000), 1-6, 17-28.

Intel Corporation,"Intel IA-64 Architecture Software Developer's Manual", vol. 2: IA-64 System Architecture, Order No. 245318-001, (Jan. 2000), i, ii, 5.1-5.3, 11.1-11.8, 11.23-11.26.

Menezes, Alfred J., et al., "Handbook of Applied Cryptography", *CRC Press Series on Discrete Mathematics and its Applications*, Boca Raton, FL, XP00215287, ISBN 0849385237,(Oct. 1996),403-405, 506-515, 570.

Nanba, S., et al., "VM/4: ACOS-4 Virtual Machine Architecture", *VM/4: ACOS-4 Virtual Machine Architecture, IEEE*, (1985), 171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID DS 0103.pdf, 1-2.

RSA Security, "Software Authenticators", www.srasecurity.com/node.asp?id+1313, 1-2.

Schneier, Bruce, "Applied Cryptography: Protocols, Algorithm, and Source Code in C", Wiley, John & Sons, Inc., XP002939871; ISBN 0471117099, (Oct. 1995), 47-52.

Schneier, Bruce, "Applied Cryptography: Protocols, Algorithm, and Source Code in C", Wiley, John & Sons, Inc., XP002138607; ISBN 0471117099, (Oct. 1995), 56-65.

Schneier, Bruce, "Applied Cryptography: Protocols, Algorithm, and Source Code in C", Wiley, John & Sons, Inc., XP0021111449; ISBN 0471117099, (Oct. 1995), 169-187.

Schneier, Bruce, "Applied Cryptography: Protocols, Algorithms, and Source Code in C", 2nd Edition; Wiley, John & Sons, Inc., XP002251738; ISBN 0471128457, (Nov. 1995), 28-33; 176-177; 216-217; 461-473; 518-522.

Hall, Judith S., et al., "Virtualizing the VAX Architecture," ACM SIGARCH Computer Architecture News, Proceedings of the 18th annual international symposium on Computer architecture, vol. 19, Issue No. 3, Apr. 1991, 10 pages.

\* cited by examiner

US 7,424,709 B2

USE OF MULTIPLE VIRTUAL MACHINE MONITORS TO HANDLE PRIVILEGED EVENTS

FIELD OF THE INVENTION

The present invention relates generally to virtual machines, and more specifically to handling privileged events using multiple virtual machine monitors.

BACKGROUND OF THE INVENTION

A conventional virtual-machine monitor (VMM) typically runs on a computer and presents to other software the abstraction of one or more virtual machines. Each virtual machine may function as a self-contained platform, running its own "guest operating system" (i.e., an operating system (OS) hosted by the VMM) and other software, collectively referred to as guest software. The guest software expects to operate as if it were running on a dedicated computer rather than a virtual machine. That is, the guest software expects to control various events and have access to hardware resources. The hardware resources may include processor-resident resources (e.g., control registers), resources that reside in memory (e.g., descriptor tables) and resources that reside on the underlying hardware platform (e.g., input-output devices). The events may include internal interrupts, external interrupts, exceptions, platform events (e.g., initialization (INIT) or system management interrupts (SMIs)), execution of certain instructions, etc.

In a virtual-machine environment, the VMM should be able to have ultimate control over these events and hardware resources to provide proper operation of guest software running on the virtual machines and for protection from and between guest software running on the virtual machines. To achieve this, the VMM typically receives control when guest software accesses a protected resource or when other events (such as interrupts or exceptions) occur. For example, when an operation in a virtual machine supported by the VMM causes a system device to generate an interrupt, the currently running virtual machine is interrupted and control of the processor is passed to the VMM. The VMM then receives the interrupt, and handles the interrupt itself or delivers the interrupt to the appropriate virtual machine.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EMBODIMENTS

Figure 1:
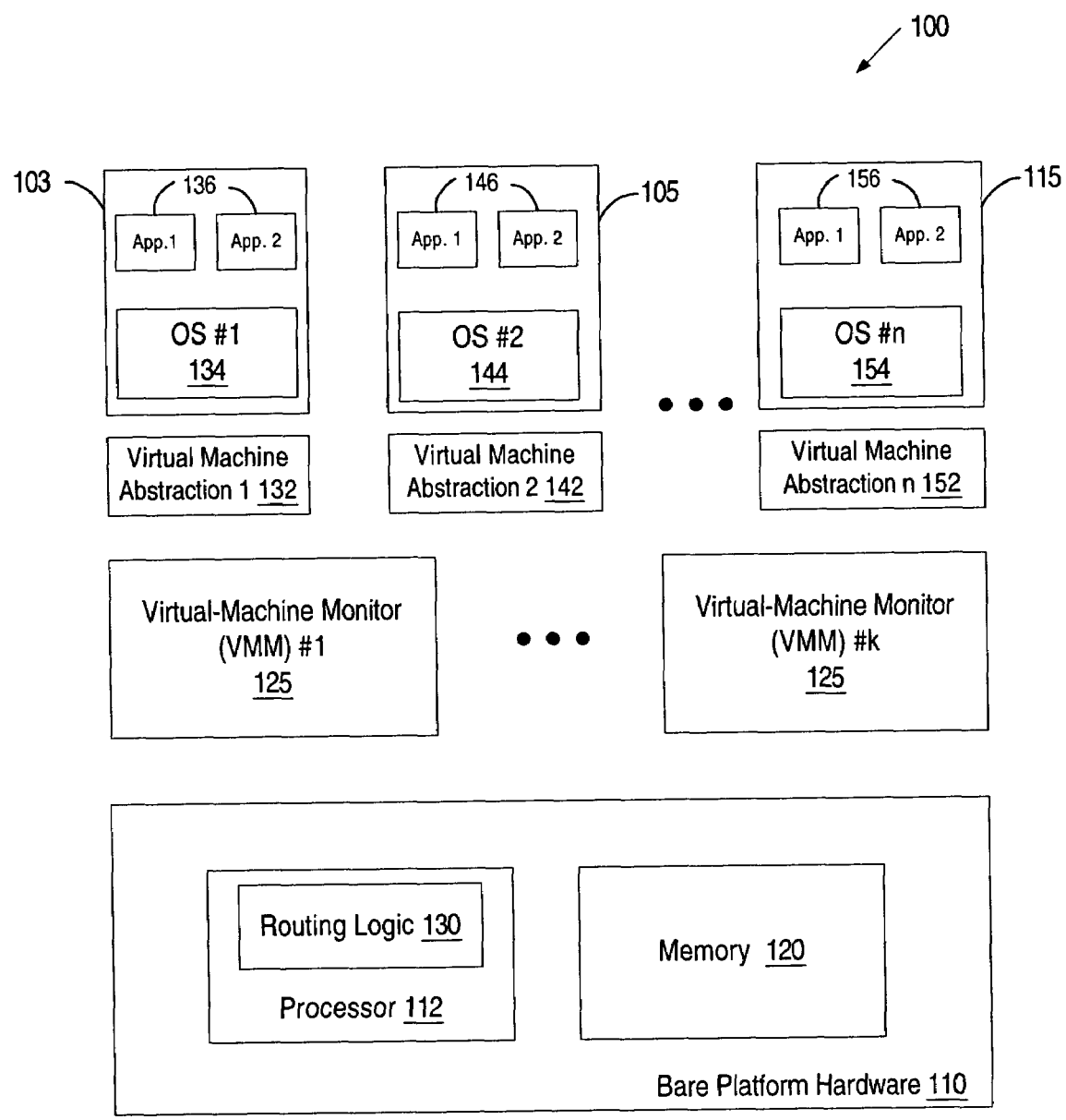
FIG. 1 illustrates one embodiment of a virtual-machine environment, in which the present invention may operate.

A method and apparatus for handling privileged events using multiple virtual machine monitors are described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe embodiments of the present invention in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer), such as a machine-readable storage medium (e.g., floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory).

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

FIG. 1 illustrates one embodiment of a virtual-machine environment 100, in which the present invention may operate. In this embodiment, bare platform hardware 110 comprises a computing platform, which may be capable, for example, of executing a standard operating system (OS) or virtual-machine monitors (VMMs), such as VMMs 125.

The platform hardware 110 can be of a personal computer (PC), mainframe, handheld device, portable computer, set-top box, or any other computing system. The platform hardware 110 includes at least one processor 112, memory 120 and possibly other platform hardware (e.g. input-output devices), not shown.

Processor 112 can be any type of processor capable of executing software, such as a microprocessor, digital signal processor, microcontroller, or the like. The processor 112 may include microcode, programmable logic or hardcoded logic for performing the execution of method embodiments of the present invention.

Memory 120 can be a hard disk, a floppy disk, random access memory (RAM), read only memory (ROM), flash memory, any combination of the above devices, or any other type of machine medium readable by processor 112. Memory 120 may store instructions or data for performing the execution of method embodiments of the present invention.

Each VMM 125, though typically implemented in software, may emulate and export a bare machine interface to higher level software. Such higher level software may comprise a standard or real-time OS, may be a highly stripped down operating environment with limited operating system functionality, may not include traditional OS facilities, etc. The VMMs 125 may be implemented, for example, in hardware, software, firmware, or by a combination of various techniques.

When running, each VMM 125 presents to "guest" software (i.e., software other than that of the VMMs 125) the abstraction of one or more virtual machines (VMs). The VMMs 125 may provide the same or different abstractions to the various guests. The guest software running on each VM may include a guest OS (e.g., a guest OS 134, 144 or 154) and various guest software applications (e.g., applications 136, 146 and 156). Collectively, guest OS and software applications are referred to herein as guest software 103, 105 and 115.

Guest software 103, 105 and 115 expects to access physical resources (e.g., processor registers, memory and I/O devices) within the VMs 132, 142 and 152 on which the guest software is running. The VMMs 125 facilitate access to resources desired by guest software while retaining ultimate control over resources within the platform hardware 110. In addition, the guest software 103, 105 and 115 expect to handle various events such as exceptions, interrupts and platform events (e.g., initialization (INIT) and system management interrupts (SMIs)). Some of these events are "privileged" because they cannot be handled by the guest software to ensure proper operation of VMs 132, 142 and 152 and guest software 103, 105 and 115 and for protection from and between guest software 103, 105 and 115. The privileged events are handled by the VMMs 125.

In particular, a specific VMM is identified to handle each privileged event. In one embodiment, a specific VMM is identified using routing logic 130. In some embodiments, the routing logic 130 is implemented as microcode, programmable logic or hardcoded logic. In other embodiments, the routing logic 130 is implemented as software residing in memory 120. In yet other embodiment, the routing logic 130 is implemented as a combination of hardware and software.

Once a specific VMM is identified, it will facilitate functionality desired by guest software while retaining ultimate control over this privileged event. The act of facilitating the functionality for the guest software may include a wide variety of activities on the part of the VMMs 125. These activities of the VMMs 125 should not limit the scope of the present invention.

Figure 2:
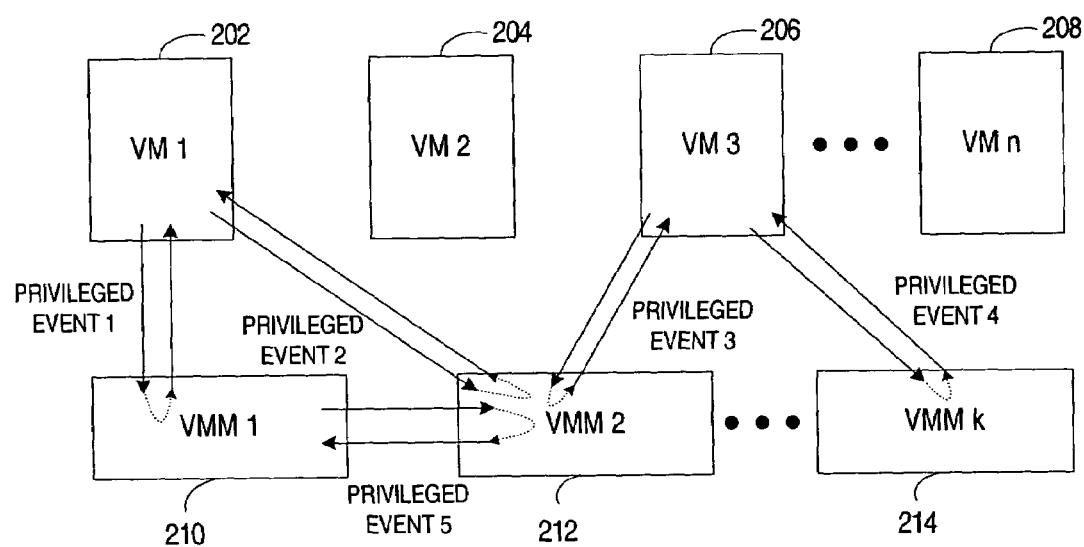
FIG. 2 illustrates a configuration of multiple VMMs in a virtual-machine environment.

The system 100 may include two or more VMMs 125 executing on the platform hardware 110. In one embodiment, the VMMs 125 run in parallel, and each VMM 125 can receive control from a VM. FIG. 2 illustrates one embodiment of such configuration of the VMMs 125 within the system 100.

Referring to FIG. 2, an exemplary parallel configuration of VMMs 210 through 214 is illustrated. According to this configuration, control transfers from a VM to a specific VMM when a privileged event occurs during the operation of a VM. The specific VMM is identified based on certain criteria as will be discussed in more detail below. Once the specific VMM is identified, the information pertaining to the virtualization event is delivered to this VMM, and control is transitioned to it. For example, privileged event 1 occurring during the operation of VM 202 may cause transition from VIA 202 to VMM 210. privileged event 2 occurring during the operation of VM 202 may cause transition from VM 202 to VMM 212, privileged event 3 occurring during the operation of VM 206 may cause transition from VM 206 to VMM 212, and privileged event 4 occurring during the operation of VM 206 may cause transition from VM 206 to VMM 214. A corresponding VMM then handles the virtualization event and may transfer control back to a VM from which the control was received. In one embodiment, the transfer of control from a VMM (e.g., VMM 210 VMM 212 or VMM 214) to a VM (e.g., VM 202, VM 204, VM 206, or VM 208) is achieved by executing a special instruction. The transfer of control from a VM to a VMM is referred to herein as a VM entry and the transfer of control from a VM to a VMM is referred to herein as a VM exit.

In one embodiment, when a VM exit occurs, control is passed to a VMM at a specific entry point (e.g., an instruction pointer value) delineated in a virtual machine control structure (VMCS) that resides in memory and is maintained by the processor. In another embodiment, control is passed to a VMM after vectoring through a redirection structure (e.g., the interrupt-descriptor table in the processor instruction set architecture (ISA) of the Intel® Pentium® 4 (referred to herein as the IA-32 ISA)). Alternatively, any other mechanism known in the art can be used to transfer control from a VM to a VMM.

A privileged event may occur during the operation of a VMM. Examples of privileged events that may occur during the operation of a VMM may include, for example, system management interrupts (SMIs), INIT, non-maskable interrupts (NMIs), hardware interrupts, interprocessor interrupts (IPIs), etc. In one embodiment, if a privileged event occurs during the operation of a VMM, routing logic is employed to identify a VMM designated to handle this privileged event. If the designated VMM is not the VMM that is currently operating, the information pertaining to the privileged event is delivered to the designated VMM, and control is transitioned to it. For example, privileged event 5 occurring during the operation of VMM 210 may cause transition from VMM 210 to VMM 212. VMM 212 then handles the privileged event and may transfer control back to VMM 210. Hence, in interactions between VMM 210 and VMM 212, VMM 210 plays a role of a VM. Accordingly, in one embodiment, a VM exit and VM entry mechanism similar to the one described above with respect to the transfer of control between a VM and a VMM is used to transfer control between the VMMs.

Figure 3:
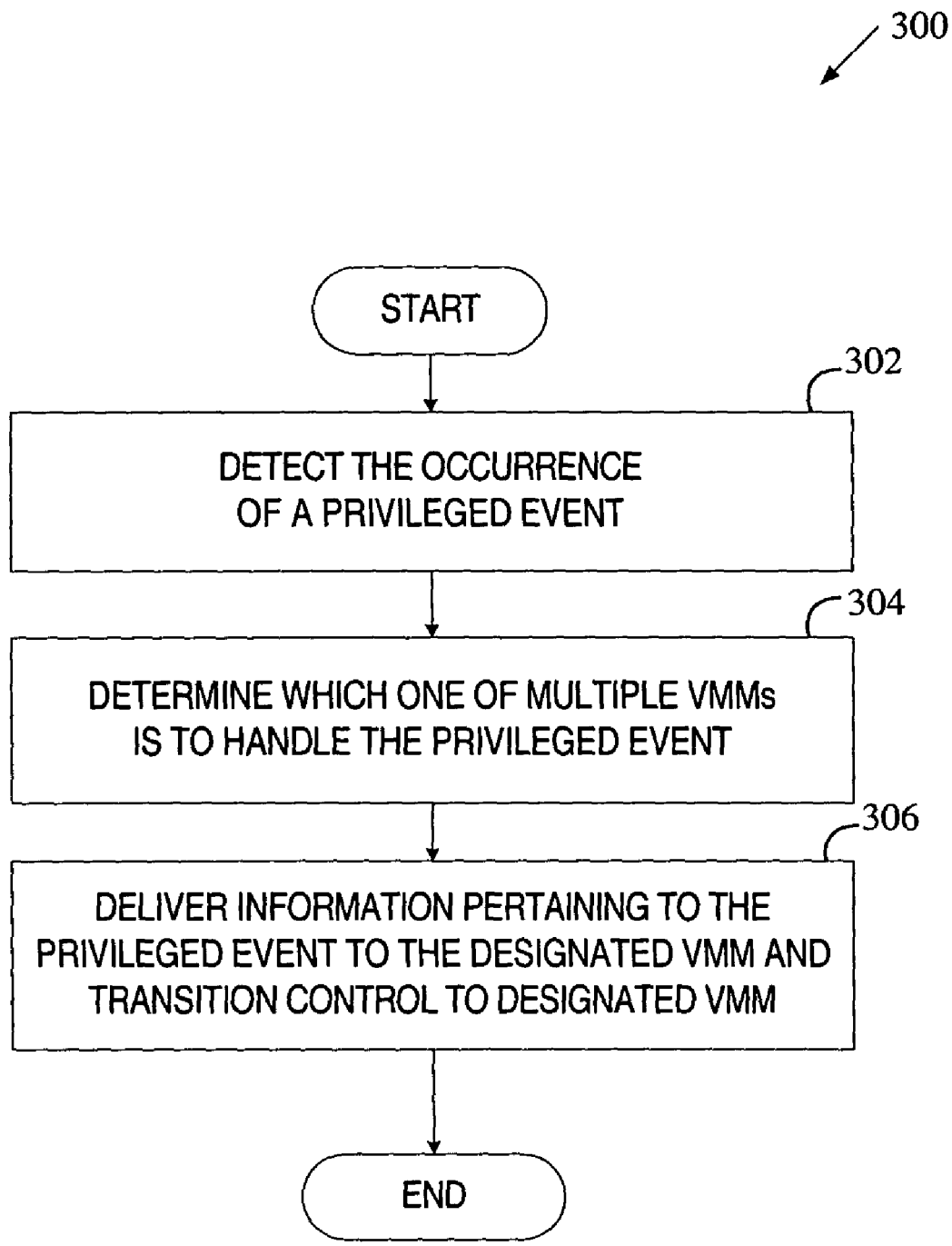
FIG. 3 is a flow diagram of one embodiment of a process for handling privileged events in a virtual-machine environment having multiple VMMs.

FIG. 3 is a flow diagram of one embodiment of a process 300 for handling privileged events in a virtual-machine environment having multiple VMMs. The process may be performed by processing logic that may comprise hardware (e.g., circuitry, dedicated logic, programmable logic, microcode, etc.), software (such as run on a general purpose computer system or a dedicated machine), or a combination of both.

Referring to FIG. 3, process 300 begins with processing logic detecting the occurrence of a privileged event (processing block 302). A privileged event is an event that is not to be handled by the currently running software. Such privileged events may include exceptions, interrupts, platform events, execution of a "privileged" instruction (an instruction whose execution causes a VM exit), etc. A privileged event may occur during the operation of guest software or during the operation of a VMM.

At processing block 304, processing logic determines which one of the multiple VMMs is to handle the privileged event. The determination may be based on various factors such as characteristics of the privileged event, current values of designated fields modifiable by the VMMs, operational parameters of the VMMs, operational parameters of guest software, etc. In one example, the determination is based on the type of the privileged event as will be discussed in greater detail below in conjunction with FIG. 4. In another example, the determination is based on current values of control fields configured by one of the multiple VMMs as will be discussed in more detail below in conjunction with FIG. 6. In yet another example, the determination is based on the evaluation of load and/or usage characteristics of the VMMs, as will be discussed in greater detail below in conjunction with FIG. 7. In still another example, the determination is based on the combination of the above factors.

Once the processing logic determines which VMM is to handle the privileged event, it delivers information pertaining to the privileged event to the designated VMM and transitions control to this VMM (processing block 306). The VMM may then handle the privileged event itself or route it to guest software for handling.

Figure 4:
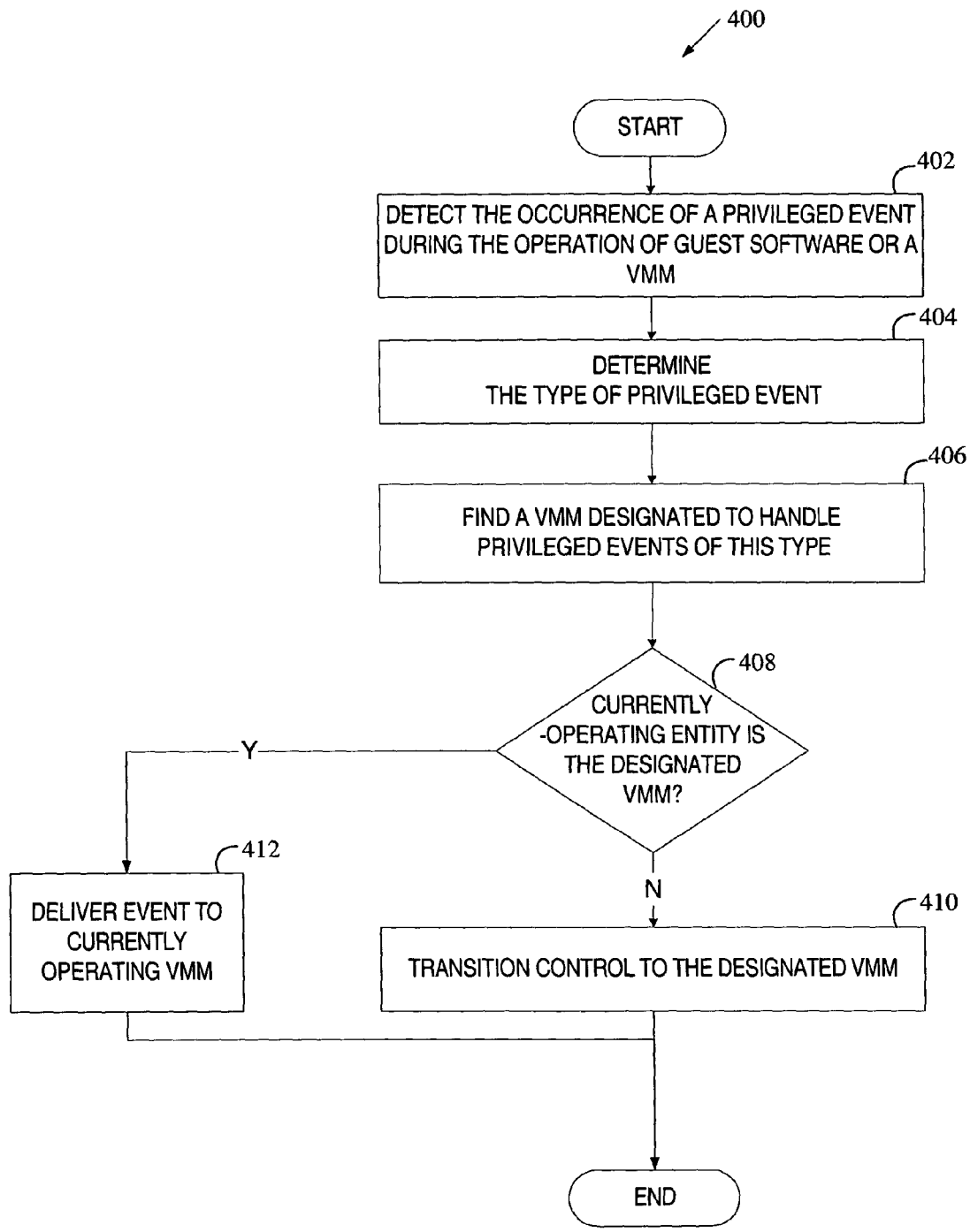
FIGS. 4, 6 and 7 illustrate exemplary embodiments of processes of identifying a VMM for handling a privileged event.
Figure 6:
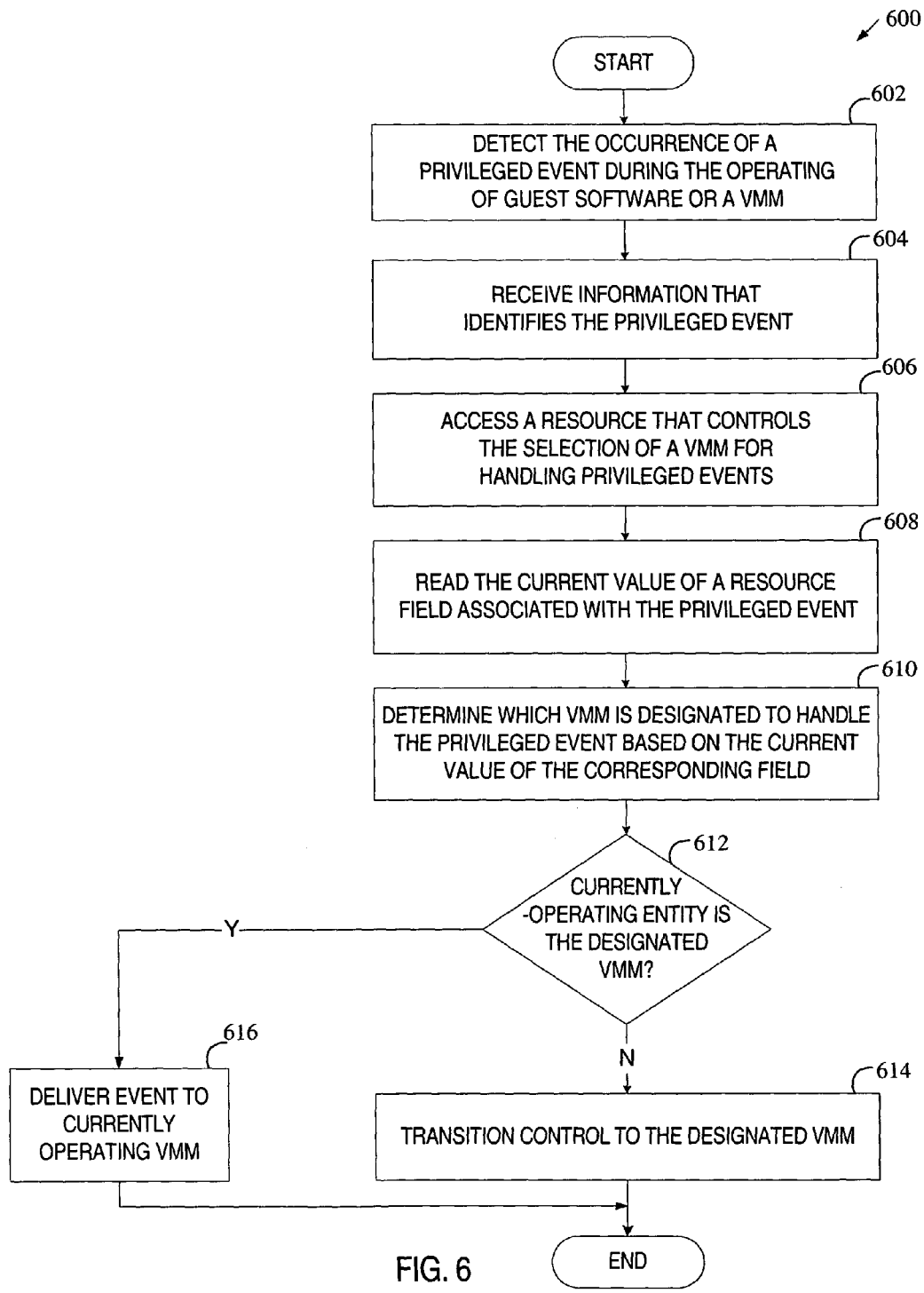
Figure 7:
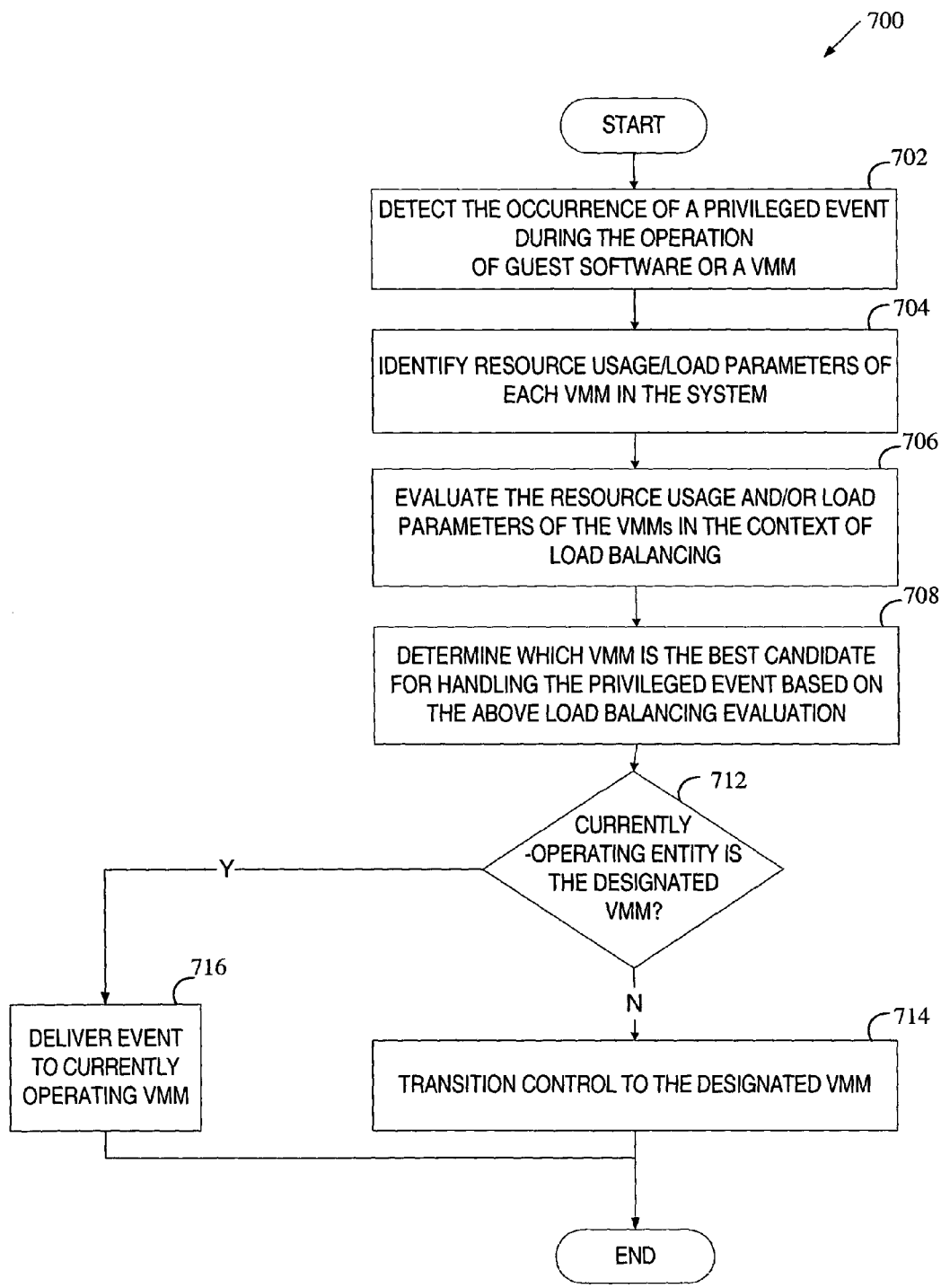

FIGS. 4, 6 and 7 illustrate exemplary embodiments of processes of identifying a VMM for handling a privileged event. The processes may be performed by processing logic that may comprise hardware (e.g., circuitry, dedicated logic, programmable logic, microcode, etc.), software (such as run on a general purpose computer system or a dedicated machine), or a combination of both.

Referring to FIG. 4, process 400 begins with processing logic detecting the occurrence of a privileged event during the operation of guest software or a VMM (processing block 402). At processing block 404, processing logic identifies the type of the privileged event. Next, processing logic determines which VMM is designated to handle privileged events of this type (processing block 406). In one embodiment, each event type is statically mapped to a particular VMM (e.g., using hardcoded logic). In another embodiment, the determination is dynamic, as described below with regard to FIG. 6. In yet another embodiment, a combination of statically determined VMMs and dynamically determined VMMs is used. That is, some event types may be statically mapped to corresponding VMMs while other event types may require some additional processor operation for the determination.

If the currently-operating entity is not the designated VMM (decision box 408), processing logic transitions control to the designated VMM (processing block 410). In one embodiment, the transition to the designated VMM may be accomplished by generating a VM exit. Alternatively, any other mechanism known in the art may be used to transition control to the designated VMM.

If the currently-operating entity is the designated VMM, the event is delivered to the currently running VMM (processing block 412). In one embodiment, the delivery of the event to the VMM is performed by synthesizing a VM exit from the VMM to itself. In another embodiment, the event is delivered as it would be delivered in a non-virtual machine environment (e.g., by vectoring through an interrupt descriptor table or causing a transition to system management mode). It should be noted that a variety of other mechanisms known in the art may be used to deliver the event to the currently running VMM.

Figure 5:
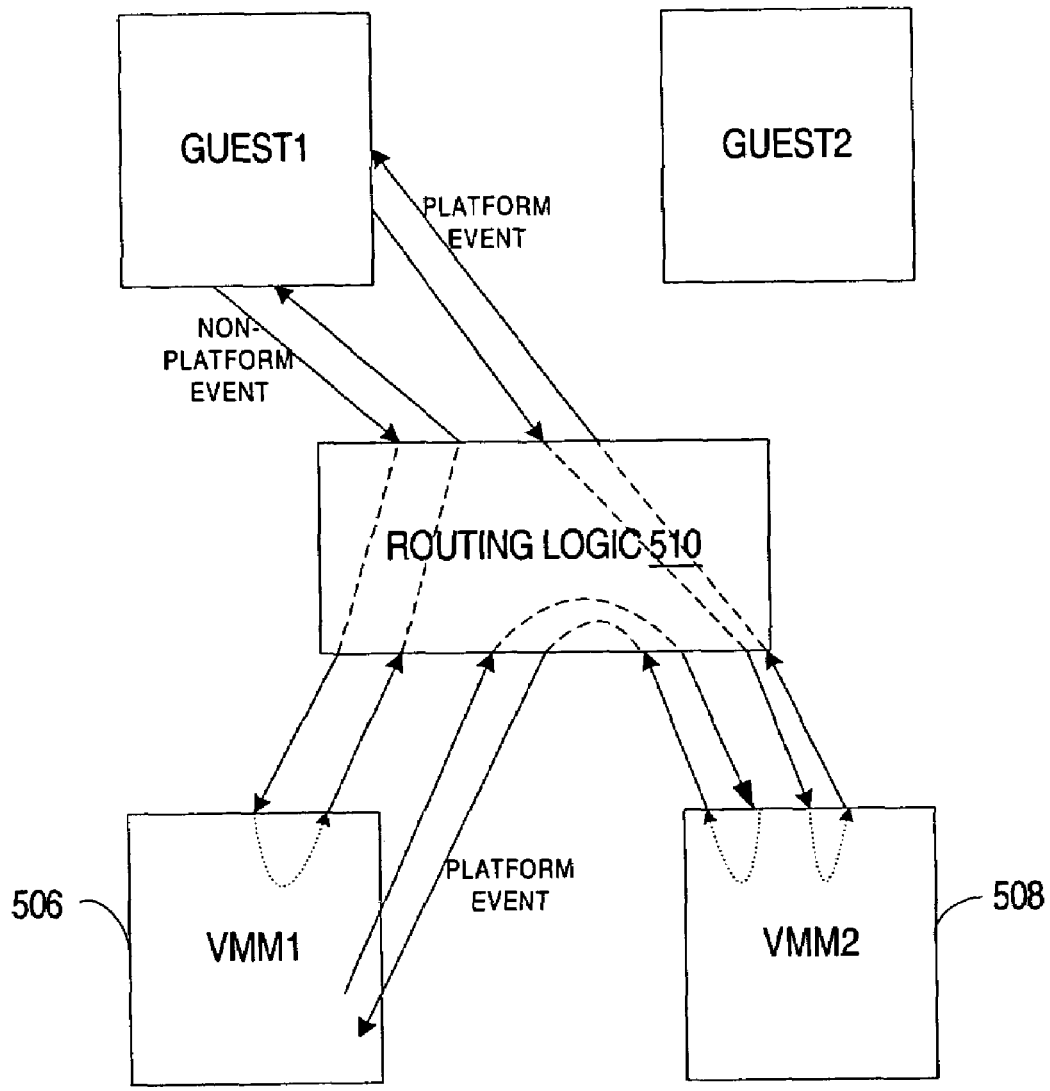
FIG. 5 illustrates an exemplary usage of process 400 in a virtual machine environment having two VMMs.

FIG. 5 illustrates an exemplary usage of process 400 shown in FIG. 4 in a virtual machine environment having two VMMs, according to one embodiment of the present invention. One of the two VMMs (e.g., VMM 508) is exclusively designated to handle certain platform events (e.g., system management interrupts (SMIs), IPIs, non-maskable interrupts, etc.). VMM 508 is referred to as the Platform VMM (PVMM). In some embodiments, the PVMM is designated to handle only SMIs. In other embodiments, PVMMs handle additional event types, as well as SMIs. In yet other embodiments, multiple PVMMs are used, each handling different platform events.

When a privileged event occurs, routing logic 510 determines the type of the event. If the event is a platform event to be handled by the PVMM 508, routing logic 510 routes it to VMM 508. Otherwise, the event is routed to VMM 506. As illustrated in FIG. 5, routing logic 510 may route events that occur during the operation of guest software or during the operation of a VMM.

The routing of an event to a VMM may differ depending on what entity was running when the event occurs. If guest software was running, the transition to the VMM selected by the routing logic 510 is performed, in one embodiment, via a VM exit. If the VMM selected by the routing logic was running when the event occurred, the event may be delivered to the VMM through a variety of mechanisms, as described above with regard to FIG. 4.

The use of a second VMM designated exclusively to handle certain platform events eliminates product dependency between hardware vendors and OS vendors. That is, it allows platform hardware vendors to develop the code for the second VMM (the PVMM) independently from OS vendors. Similarly, OS vendors can develop the code for the first VMM independently from the hardware vendors. In addition, the use of two VMMs performing different functionality enhances system security and limits the exposure of the code that needs to be validated for security.

Referring to FIG. 6, process 600 begins with processing logic detecting the occurrence of a privileged event during the operation of guest software or a VMM (processing block 602). At processing block 604, processing logic receives information that identifies the privileged event. Next, processing logic accesses a resource (e.g., an in-memory data structure, a processor register, memory in the platform chipset, a register in an input-output device, etc.) that controls the selection of a VMM for handling privileged events (processing block 606) and reads the current value of a resource field associated with the identifier of the privileged event (processing block 608).

In one embodiment, the identifier of the privileged event is the type of the privileged event, and processing logic uses the type of the privileged event to identify a resource field value associated with this type of privileged event.

In another embodiment, the identifying information identifies a specific input-output address associated with the privileged event. In this embodiment, processing logic analyzes the input-output access associated with the privileged event, determines what input-output address is being accessed, and then uses this input-output address to find a resource field value associated with an input-output address range to which the determined input-output address belongs. In one embodiment, the values of the resource fields are set during the initialization and cannot be modified. In another embodiment, the values of the resource fields can be dynamically configured by a VMM (e.g., a main VMM) based on such factors as security requirements, the VMM's knowledge of the platform, etc. This dynamic configuration of resource field values allows for VMM functionality to be partitioned, possibly improving security, system performance, development methodologies, etc.

Further, processing logic determines which VMM is designated to handle the privileged event based on the current value of the corresponding field (processing block 610) and, if the currently-operating entity is not the designated VMM (decision box 612), transitions control to the designated VMM (processing block 614). In one embodiment, the transition to the designated VMM may be accomplished by generating a VM exit. Alternatively, the transition to the designated VMM may be accomplished through any other mechanism in the art.

If the designated VMM is the currently-operating entity, processing logic delivers the event to that VMM (processing block 616), as described above in conjunction with FIG. 4 and FIG. 5.

Referring to FIG. 7, process 700 begins with processing logic detecting the occurrence of a privileged event during the operation of guest software or a VMM (processing block 702). At processing block 704, processing logic identifies resource usage/load parameters of each VMM in the system. Next, processing logic evaluates the resource usage and/or load parameters of the VMMs in the context of load balancing (processing block 706) and determines which VMM is the best candidate for handling the privileged event based on the above load balancing evaluation (processing block 708). Further, if the currently operating entity is not the VMM that was identified as the best candidate (decision box 712), processing logic transitions control to the identified VMM (processing block 714). In one embodiment, the transition to the identified VMM may be accomplished by generating a VM exit. Alternatively, the transition to the identified VMM may be accomplished through any other mechanism in the art.

If the designated VMM is the currently-operating entity, processing logic delivers the event to that VMM (processing block 716), as described above in conjunction with FIGS. 4-6.

Thus, a method and apparatus for handling privileged events using multiple VMMs have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    detecting an occurrence of one of a plurality of privileged events in a virtual machine (VM) environment having guest software and a plurality of virtual machine monitors (VMMs), wherein the plurality of VMMs is designated to handle the plurality of privileged events that cannot be handled by the guest software in the VM environment;
    determining which one of the plurality of VMMs is to handle the detected privileged event based on at least one of a characteristic of the detected privileged event or characteristics of the VMMs; and
    transitioning control to said one of the plurality of VMMs.

2. The method of claim 1 wherein the plurality of VMMs includes a main VMM and one or more parallel VMMs.

3. The method of claim 1 wherein determining which one of a plurality of VMMs is to handle the detected privileged event comprises:
    determining a type of the detected privileged event; and
    identifying one of the plurality of VMMs that is designated to handle privileged events of the determined type.

4. The method of claim 1 wherein determining which one of a plurality of VMMs is to handle the detected privileged event comprises:
    accessing a field associated with the detected privileged event in a resource; and identifying one of the plurality of VMMs tat is designated to handle the detected privileged event based on a value of the field.

5. The method of claim 4 wherein the field associated with the detected privileged event is a field associated with a type of the detected privileged event.

6. The method of claim 4 wherein the field associated with the detected privileged event is a field associated with an input-output address range to which an input-output address of the detected privileged event belongs.

7. The method of claim 4 wherein the value of the field associated with the detected privileged event is either predetermined or dynamically configurable.

8. The method of claim 1 wherein determining which one of a plurality of VMMs is to handle the detected privileged event comprises:
evaluating resource usage parameters of the plurality of VMMS; and
identifying one of the plurality of VMMs that is designated to handle the detected privileged event based on evaluation of the resource usage parameters.

9. The method of claim 4 wherein the resource resides in any one of a memory, a processor, a chipset, and an input-output device.

10. The method of claim 1 wherein the detected privileged event represents any one of an interrupt, an exception, an execution of a privileged instruction, and a platform event.

11. The method of claim 1 wherein the detected privileged event occurs during an operation of guest software.

12. The method of claim 1 wherein the detected privileged event occurs during an operation of one of the plurality of VMMs.

13. A system comprising:
a memory having stored therein a plurality of virtual machine monitors (VMMs) designated to handle a plurality of privileged events; and
a processor, coupled to the memory, the processor comprising routing logic to detect an occurrence of one of the plurality of privileged events that cannot be handled by guest software, to determine which one of the plurality of VMMs is to handle the detected privileged event based on at least one of a characteristic of the detected privileged event or characteristics of the VMMs, and to transition control to said one of the plurality of VMMs.

14. The system of claim 13 wherein the plurality of VMMs includes a main VMM and one or more parallel VMMs.

15. The system of claim 13 wherein the routing logic is to determine which one of the plurality of VMMs is to handle the detected privileged event by determining a type of the privileged event, and identifying one of the plurality of VMMs that is designated to handle privileged events of the determined type.

16. The system of claim 13 wherein the routing logic is to determine which one of the plurality of VMMs is to handle the detected privileged event by evaluating resource usage parameters of the plurality of VMMs, and identifying one of the plurality of VMMs that is designated to handle the detected privileged event based on evaluation of the resource usage parameters.

17. The system of claim 13 wherein the detected privileged event represents any one of an interrupt, an exception, an execution of a privileged instruction, and a platform event.

18. The system of claim 13 wherein the detected privileged event occurs during an operation of guest software.

19. The system of claim 13 wherein the detected privileged event occurs during an operation of one of the plurality of VMMs.

20. A system comprising:
a memory having stored therein guest software and a plurality of virtual machine monitors (VMMs) designated to handle a plurality of privileged events; and
a processor, coupled to the memory, to execute the guest software, to detect an occurrence of one of the plurality of privileged events that cannot be handled by the guest software, to determine which one of the plurality of VMMs is to handle the detected privileged event based on at least one of a characteristic of the detected privileged event or characteristics of the VMMs, and to transition control to said one of the plurality of VMMs.

21. The system of claim 20 wherein the plurality of VMMs includes a main VMM and one or more parallel VMMs.

22. The system of claim 20 wherein the processor is to determine which one of the plurality of VMMs is to handle the detected privileged event by determining a type of the privileged event, and identifying one of the plurality of VMMs that is designated to handle privileged events of the determined type.

23. The system of claim 20 wherein the processor is to determine which one of the plurality of VMMs is to handle the detected privileged event by evaluating resource usage parameters of the plurality of VMMs, and identifying one of the plurality of VMMs that is designated to handle the detected privileged event based on evaluation of the resource usage parameters.

24. The system of claim 20 wherein the privileged event represents any one of an interrupt, an exception, an execution of a privileged instruction, and a platform event.

25. The system of claim 20 wherein the detected privileged event occurs during operation of any one of guest software and one of the plurality of VMMs.

26. A machine-readable storage medium storing instructions which, when executed by a processing system, cause the processing system to perform a method, the method comprising:
detecting an occurrence of one of a plurality of privileged events in a virtual machine (VM) environment having guest software and a plurality of virtual machine monitors (VMMs), wherein the plurality of VMMs is designated to handle the plurality of privileged events that cannot be handled by the guest software in the VM environment;
determining which one of the plurality of VMMs is to handle the detected privileged event based on at least one of a characteristic of the detected privileged event or characteristics of the VMMs; and
transitioning control to said one of the plurality of VMMs.

27. The machine-readable medium of claim 26 wherein the plurality of VMMs includes a main VMM and one or more parallel VMMs.

28. The machine-readable medium of claim 26 wherein the detected privileged event represents any one of an interrupt, an exception, an execution of a privileged instruction, and a platform event.

29. The machine-readable medium of claim 26 wherein the detected privileged event occurs during operation of any one of guest software and one of the plurality of VMMs.

* * * * *

UNITED STATES PATENT AND TRADEMARK OFFICE
CERTIFICATE OF CORRECTION

PATENT NO.         : 7,424,709 B2                                           Page 1 of 1
APPLICATION NO.    : 10/663206
DATED              : September 9, 2008
INVENTOR(S)        : Neiger et al.

It is certified that error appears in the above-identified patent and that said Letters Patent is hereby corrected as shown below:

In column 9, at line 1 delete, "tat" and insert --that--.

Signed and Sealed this

Twenty-second Day of December, 2009

David J. Kappos
*Director of the United States Patent and Trademark Office*